United States Patent [19]

Michaelis

[11] 3,735,370

[45] May 22, 1973

[54] INPUT FOR SINGLE-WALL DOMAIN ARRANGEMENT

[75] Inventor: Paul Charles Michaelis, Watchung, N.J.

[73] Assignee: Bell Telephone Laboratories, Incorporated, Murray Hill, N.J.

[22] Filed: Nov. 9, 1971

[21] Appl. No.: 196,901

[52] U.S. Cl. ........................340/174 TF, 340/174 SR
[51] Int. Cl. ..............................................G11c 11/14
[58] Field of Search .................................340/174 TF

[56] References Cited

UNITED STATES PATENTS 3,633,185 1/1972 Danylchuk......................340/174 TF

OTHER PUBLICATIONS

IBM Technical Disclosure Bulletin – Vol. 14, No. 4, Sept. 1971, pg. 1259–1260.

*Primary Examiner*—James W. Moffitt
*Attorney*—W. L. Keefauver

[57] ABSTRACT

The geometry of a magnetically soft input which defines the path of a seed domain employed to generate information-representative domains for movement in a field access single-wall domain memory is modified to ensure that the seed domain be retained at the input when the drive field which causes domain movement in such arrangements is terminated.

3 Claims, 6 Drawing Figures

FIG. 1
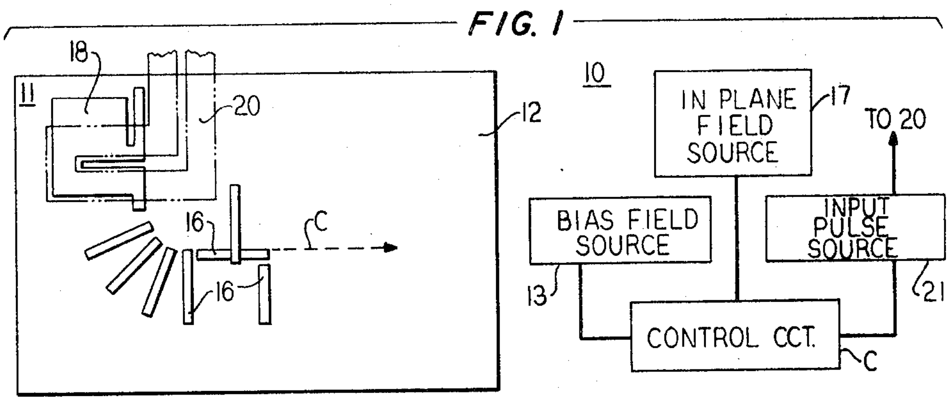
FIG. 2
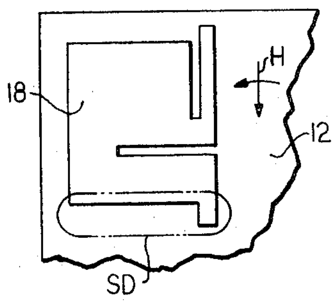
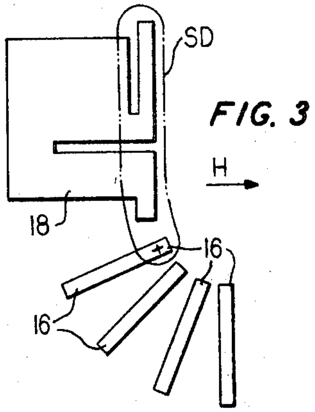
FIG. 4
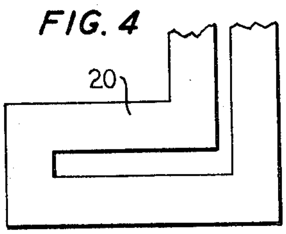
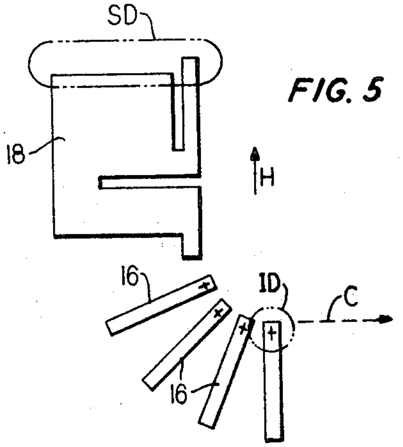
FIG. 6
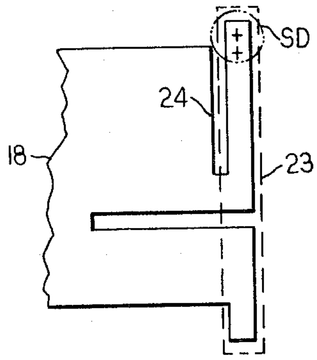

INPUT FOR SINGLE-WALL DOMAIN ARRANGEMENT

FIELD OF THE INVENTION

This invention relates to magnetic information stores and more particularly to such stores of the type which employ single-wall domains.

BACKGROUND OF THE INVENTION

The movement of single-wall domains in a layer of magnetic material along paths defined by elements coupled to the layer is well known. Typically, these elements comprise magnetically soft material, for example, permalloy of T and bar-shaped geometry organized to exhibit changing pole patterns which effect domain displacement in the layer responsive to a magnetic field rotating in the plane of the layer. Arrangements for moving domains in this manner are described in U.S. Pat. No. 3,534,347 of A. H. Bobeck issued Oct. 13, 1970 and are commonly referred to as "field access" arrangements.

Arrangements for introducing domains into domain stores operative in the field access mode conveniently include a disc or square-shaped magnetically soft area adjacent the beginning of each propagation path defined by the magnetically soft elements. A domain called a "seed domain" moves about the periphery of the square-shaped area as the in-plane field rotates. When the seed domain passes the beginning of the propagation path, it tries to follow poles moving about the periphery of the square and along the path as well. The result is that the seed domain is stretched into two domains, one moving along the propagation path, the other forming a new seed domain. Field access inputs of this type are disclosed in U.S. Pat. No. 3,555,527 of A. J. Perneski, issued Jan. 12, 1971.

In some single-wall domain arrangements operative in the field access mode, the in-plane field is deactivated normally during operation. This is true, for example, in telephone repertory dialers of this type. In other arrangements, a power failure could terminate the in-plane field at some unpredictable field orientation. The circuitry for generating the in-plane field is designed to stop the field at a precise orientation even if a power failure should occur and to start the field at an orientation to next move domains from the known positions which they occupy at that precise orientation.

Although circuitry of this type resolves problems related to the correct positioning of information due to activation and deactivation of the in-plane field, a problem still exists with respect to the seed domain. For example, if the field terminates while aligned with a first magnetically soft element at the beginning of a propagation path, a seed domain on the periphery of an adjacent permalloy square may "see" a relatively strong pole at that first element and be pulled from the periphery as the field magnitude diminishes. Of course, without such a seed domain, no further input is possible.

Nor is this problem easily avoided because propagation path orientations are often not parallel to one another and the orientations of propagation path-defining elements for different nonparallel propagation paths at inputs often occur at a variety of angles to one another. Consequently, a choice of a particular terminating orientation for the in-plane field does not always ensure the presence of a seed domain when the in-plane field is next present.

BRIEF DESCRIPTION OF THE INVENTION

The present invention is based on the recognition that the geometry of the magnetically soft input can be designed to permit the seed domain to move about the periphery thereof unobstructed in response to the rotating in-plane field yet be sufficiently modified from a usual form to define a relatively strong pole at that periphery in the event that the in-plane field terminates at an orientation to create strong poles at the path-defining elements adjacent the input. Specifically, a permalloy input of square geometry is formed with a slot narrow compared to the diameter of the seed domain. The slot defines an elongated element as a part of the input and is sufficiently narrow to be ignored by the seed domain during normal operation. The elongated element is aligned with a propagation path-defining element adjacent the input and is of a length to provide a relatively strong pole thereon to attract the seed domain to a known position on the periphery of the input square rather than permit the seed domain to be withdrawn from the periphery by strong poles on the path-defining element.

BRIEF DESCRIPTION OF THE DRAWING

FIG. 1 shows a portion of a field access, single-wall domain arrangement including an input in accordance with this invention;

FIGS. 2, 4 and 6 show portions of the input of FIG. 1; and

FIGS. 3 and 5 show the input of FIG. 1 in conjunction with a pattern of elements defining a domain channel originating at the input along with the magnetic conditions therein during operation.

DETAILED DESCRIPTION

FIG. 1 shows a domain propagation arrangement 10 including an input 11 in accordance with this invention. The arrangement comprises a layer of material 12 in which single-wall domains can be moved. A bias field source represented by block 13 provides a field for maintaining domains in layer 12 at a prescribed nominal diameter.

A pattern of magnetically soft, path-defining elements 16 is formed adjacent layer 12 for defining changing pole patterns in response to a magnetic field rotating counterclockwise in the plane of layer 12 resulting in the movement of domains from left to right as viewed in the figure. The in-plane field is supplied by a source represented by block 17 in FIG. 1.

The pattern of elements originates to the left at a generally rectangular element 18 shown enlarged in FIG. 2. Element 18 is normally operative to generate domains for movement along a channel C defined by elements 16 in response to the rotating in-plane field. When the in-plane field reorients counterclockwise from a downward orientation indicated by arrow H in FIG. 2, a seed domain SD moves from the bottom of element 18 to the right side thereof as shown in FIG. 3. When the seed domain is in this latter position, a pulse is applied normally to conductor 20 shown in FIGS. 1 and 4 resulting in a separation of an information domain ID from the seed domain SD for movement along elements 16 to the position shown in FIG. 5 when the in-plane field is next directed upward.

Conductor-responsive input arrangements of this general type are shown in P. I. Bonyhard U.S. Pat. No. 3,611,331 issued Oct. 5, 1971. Conductor 20 is connected to an input pulse source represented by block 21 in FIG. 1. In the absence of such a pulse, the arrangement produces no domain for movement along C as is now well understood in the art.

Sources 13, 17 and 21 are connected to a control circuit C for activation and synchronization.

As the in-plane field reorients from the right to an upward orientation as indicated by the arrows H in FIGS. 3 and 5, a succession of strong poles is generated in elements 16 as indicated by the plus signs in FIG. 5, the strongest poles being generated in the element most closely aligned with the field at any given instant. Should a power failure cause the in-plane field to collapse at this juncture, the poles in elements 16 are often sufficiently strong to withdraw the seed domain to the position of domain ID in FIG. 5 or to the position of one of the preceding poles. Should this occur, element 18 would be incapable of generating additional information domains when power is later restored.

In accordance with the present invention, on the other hand, the seed domain is not withdrawn from the periphery of element 18 should a power failure occur. The reason for this is that element 18 is of a geometry to define a generally rectangular portion included within broken closed line 23 in FIG. 6. This portion has its long axis oriented such that if a power failure occurs when the in-plane is in the quadrant between its orientations of FIGS. 3 and 5, a relatively strong pole generated at the top of the element ensures the movement of the seed domain to a proper position at the periphery of element 18 as shown in FIG. 6.

The requirements for the rectangular element encompassed by broken line 23 in FIG. 6 are that it be sufficiently long to produce relatively strong poles compared to those produced in the adjacent channel or path-defining elements when the in-plane field is rotating through the critical quadrant and that those poles be consistent with the requisite movement of the seed domain during normal operation. The first requirement is met by making the elements relatively long compared to elements 16 ensuring longer pole separation and thus increased strength. Since, in general, a domain prefers to remain coupled to a permalloy element rather than move to a spaced-apart permalloy element, the rectangular portion of element 18 need not necessarily be longer than an adjacent element 16 to establish a preferred destination. The seed domain normally would prefer to stay coupled to element 18.

Slot 24 in FIG. 6 which defines the rectangular portion encompassed by broken line 23 is sufficiently narrow so that a domain virtually ignores the slot when the in-plane field is oriented as in FIG. 5 to move the seed domain to the top of element 18. Thus, no impairment of normal operation is caused by the presence of the modified geometry. Actually, the portion encompassed by broken line 23 may be defined as a separate element of like geometry adjacent input 18 rather than as a portion of 18 as shown, also without impairment of normal operation.

In one specific embodiment of this invention, magnetically soft (permalloy) elements were formed by photolithographic techniques on (slightly spaced from) the surface of an epitaxial film of Erbium Europium Gallium garnet ($Er_2 Eu_1 Ga_{.6} Fe_{4.4} O_{12}$). The film exhibited domains having a nominal diameter of 8 microns in the presence of a bias field of 65 oersteds. An in-plane field of 35 oersteds rotating at 0.3 kilocycles resulted in the movement along channel C of domains generated selectively in response to 300 milliampere pulses of two-microsecond duration applied to conductor 20 when seed domain SD was in the position shown in FIG. 3.

Elements 16 had the dimensions of 28 × 3.5 × 0.4 microns and element 18 had the overall dimensions 35 × 3.5 × 0.4 microns. The rectangular section of element 18 had the dimensions 42 × 36 microns, slot 24 of FIG. 6 being 2 microns wide.

The termination of the in-plane field in the quadrant defined by the field orientations represented by arrows H in FIGS. 3 and 5 resulted in the positioning of seed domain SD as shown in FIG. 6. Subsequent operation was unimpaired when the in-plane field was next supplied.

What has been described is considered merely illustrative of the principles of this invention. Therefore, various modifications can be devised by those skilled in the art in accordance with those principles within the spirit and scope of this invention.

What is claimed is:

1. A magnetic domain propagation arrangement comprising a layer of material in which single-wall domains can be moved, magnetically soft elements in which changing magnetic pole patterns are generated for defining a propagation channel for the movement of domains from a first element in said layer responsive to a magnetic field reorienting in the plane of said layer, and first means for supplying domains for movement along said channel, said first means comprising a magnetically soft input layer of a geometry to move a domain about the periphery thereof in response to said field and also including an element having a geometry and being positioned to provide at a first position on said periphery magnetic poles relatively stronger than those generated in said first element when said field is reduced in an orientation to produce strong poles in said first element wherein each of said first portion and said first element have elongated geometries the long axes of which are aligned with one another.

2. An arrangement in accordance with claim 1 wherein said first element is separated from said input layer by a plurality of elongated elements having axes consecutively more closely aligned with the axis of said element with distance therefrom.

3. An arrangement in accordance with claim 1 also including a conductor of a geometry to generate a localized field of a polarity to constrict a domain extended between said first element and said first position.

* * * * *